United States Patent [19]

Carvalho et al.

[11] Patent Number: 4,808,862
[45] Date of Patent: Feb. 28, 1989

[54] MOTORIZED TOOL WITH EASILY REPLACEABLE SWITCH

[75] Inventors: Joseph J. Carvalho; Sequndo R. Mapili, Jr., both of Honolulu, Hi.

[73] Assignee: Joseph J. Carvalho, Kailua, Hi.

[21] Appl. No.: 110,967

[22] Filed: Oct. 20, 1987

[51] Int. Cl.⁴ .................. B23B 45/2; H02K 7/14; F16D 11/00
[52] U.S. Cl. .................. 310/50; 200/61.58 R; 310/78; 310/89; 439/928; 192/67 R
[58] Field of Search .................. 173/13, 15, 18; 192/67 R, 67 P; 200/153 T, 280, 281, 61.58 R; 310/50, 68 B, 68 R, 71, 47, 78, 89; 408/9, 11, 12, 14, 710; 439/928

[56] References Cited

U.S. PATENT DOCUMENTS

| | | | |
|---|---|---|---|
| 3,471,662 | 10/1969 | Berchtold | 200/61.58 R |
| 4,161,242 | 7/1979 | Moores, Jr. et al. | 192/67 R |
| 4,689,534 | 8/1987 | Gerber et al. | 310/50 |
| 4,739,129 | 4/1988 | Owen et al. | 200/281 |

OTHER PUBLICATIONS

GE, "Interchangeable Power Tools", Ad in Saturday Evening Post, 19 Nov. 66, p. 83.

Primary Examiner—Patrick R. Salce
Assistant Examiner—D. L. Rebsch
Attorney, Agent, or Firm—Martin E. Hsia

[57] ABSTRACT

An electric hand tool with a detachable switch mounted between the handle and a detachably mounted nosepiece to allow easy access to, and replacement of, the switch in case of malfunction. The nosepiece is movable in response to pressure on the workpiece. Movement of the nosepiece closes the switch for activating the motor.

20 Claims, 2 Drawing Sheets

MOTORIZED TOOL WITH EASILY REPLACEABLE SWITCH

BACKGROUND OF THE INVENTION

This invention relates to motorized tools that are constructed for easy replacement of the switch.

Motorized and electric tools have been known for a very long time. For example, electrically driven hand held drills have been used for many years. An example of such a drill is disclosed in U.S. Pat. No. 3,471,662 issued to R. F. Berchtold. That patent discloses a hand drill in which axial movement of the shaft activates a switch to start and stop the drill motor. Drills in which the motor is activated by a trigger are also well known.

A drawback to the prior art motorized tools is that if the switch of the tool malfunctions, the entire tool must be sent for professional repair or servicing and is unavailable while being repaired or serviced. Thus, if a motorized tool being used by a worker fails because of a switch malfunction, the worker who was using that tool cannot work until the tool is replaced or repaired. Because the worker is paid by the hour, this period of unavailability can be extremely expensive. Thus, there is a need for a tool in which the switch can be easily replaced without sending the tool for repairs to a repair shop. It, therefore, is an object of this invention to provide a motorized tool in which the switch can be easily repaired or replaced.

SHORT STATEMENT OF THE INVENTION

The motorized tool of this invention comprises a motor mounted in a motor housing, with a switch detachably mounted on the motor housing, a nosepiece removably mounted on the motor housing and over the switch, so that removal of the nosepiece exposes the switch for maintenance, and a tool assembly movably mounted in the nosepiece, with the motor and the tool assembly interconnected so that the tool assembly is activated when the motor is energized. If the switch malfunctions, the nosepiece can be removed to expose the malfunctioning switch for repair or replacement. Thus, a switch malfunction can be repaired without professional servicing in a few minutes, and the worker can return to work almost immediately.

DETAILED DESCRIPTION OF THE PREFERRED EMBODIMENT

Figure 1:
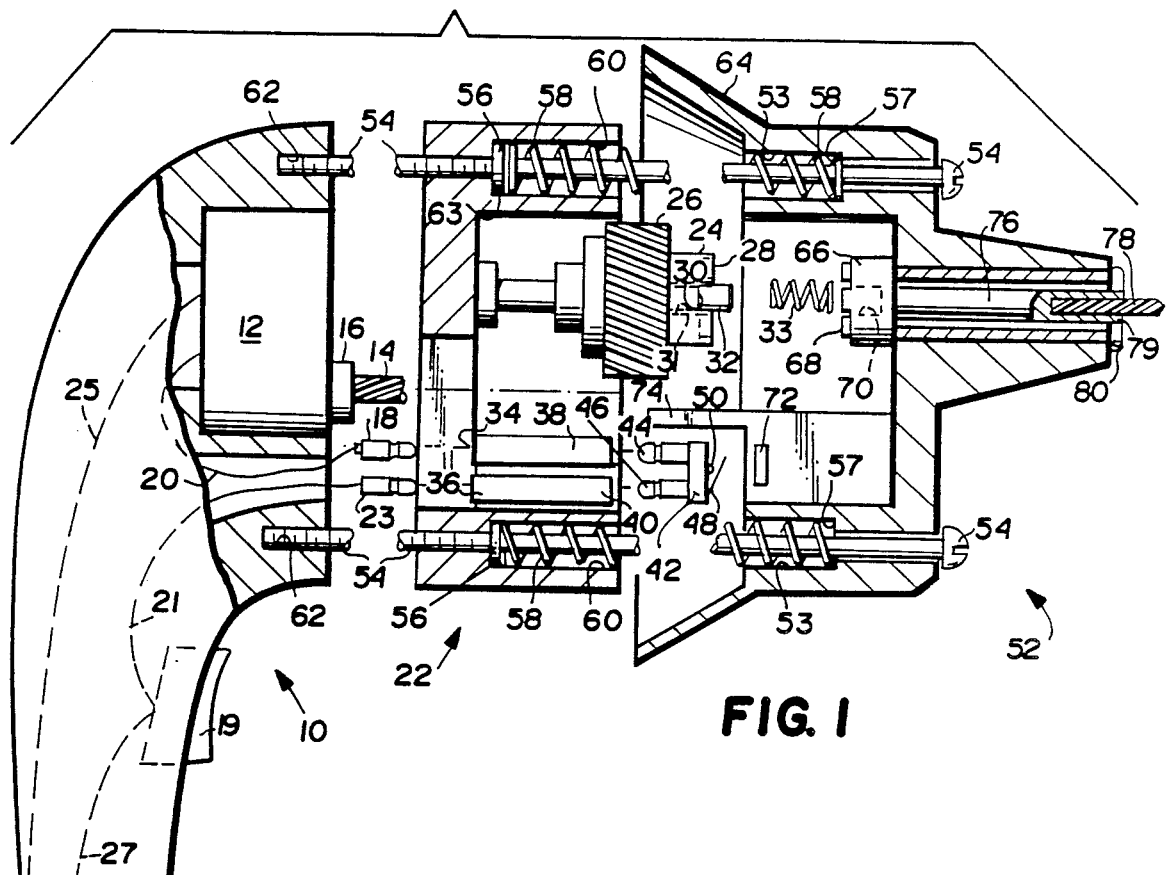
FIG. 1 is a fragmentary side elevational view of a preferred embodiment of a motorized tool according to the present invention, with parts broken out and in cross-section for ease of illustration.

The preferred embodiment of the present invention is illustrated by way of example in FIGS. 1 to 5. The tool includes a handle 10, in which an electric motor 12 is mounted. A gear 14 is mounted on the shaft 16 of the motor 12. A male plug 18 is attached to the electric motor's first wire 20. A forward-reverse switch 19 of conventional design is mounted in the handle 10. A male plug 23 is attached to the forward-reverse switch's first wire 21. The electric motor's second wire 25 and the forward-reverse switch's second wire 27 are connected to the power source for the tool.

Figure 5A:
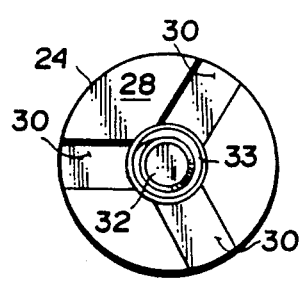
FIG. 5a is an enlarged end view of the clutch bearing looking from right to left in FIG. 1.

A connection module 22 is detachably attached to the handle 10 by screws 54. As best illustrated in FIGS. 1 and 5a, a clutch bearing 24 having peripheral teeth 26 is rotatably mounted on a shaft 32 mounted in the connection module 22. The peripheral teeth 26 intermesh with the gear 14 mounted on the shaft 16 of the motor 12. The contact face 28 of the clutch bearing 24 has three symmetrically disposed radial depressions 30 and the shaft 32 projects through a shaft passage 33 in the contact face 28 of the clutch bearing 24. Four female sockets 34, 36, 38 and 40 are also mounted in the connection module 22. Female sockets 34 and 38 are integrally formed and electrically connected and female sockets 36 and 40 are integrally formed and electrically connected. Male plugs 18 and 23 are inserted into female sockets 34 and 36, respectively.

A switch 42 having male plugs 44 and 46 is mounted on the connection module 22 by plugging in male plugs 44 and 46 into female sockets 38 and 40. The switch 42 has a hinged lever arm 48 that abuts against a button 50 that opens and closes said switch 42. The switch 42 is similar to the Mulon S1-2NW1 switch (except with only two prongs, instead of three) and is preferably of five ampere capacity at 125 volts alternating current.

A nosepiece 52 is detachably and displaceably mounted on the handle 10 and the connection module 22 by three partially threaded screws 54 having lock washers 56 and springs 58 mounted thereon.

Figure 2:
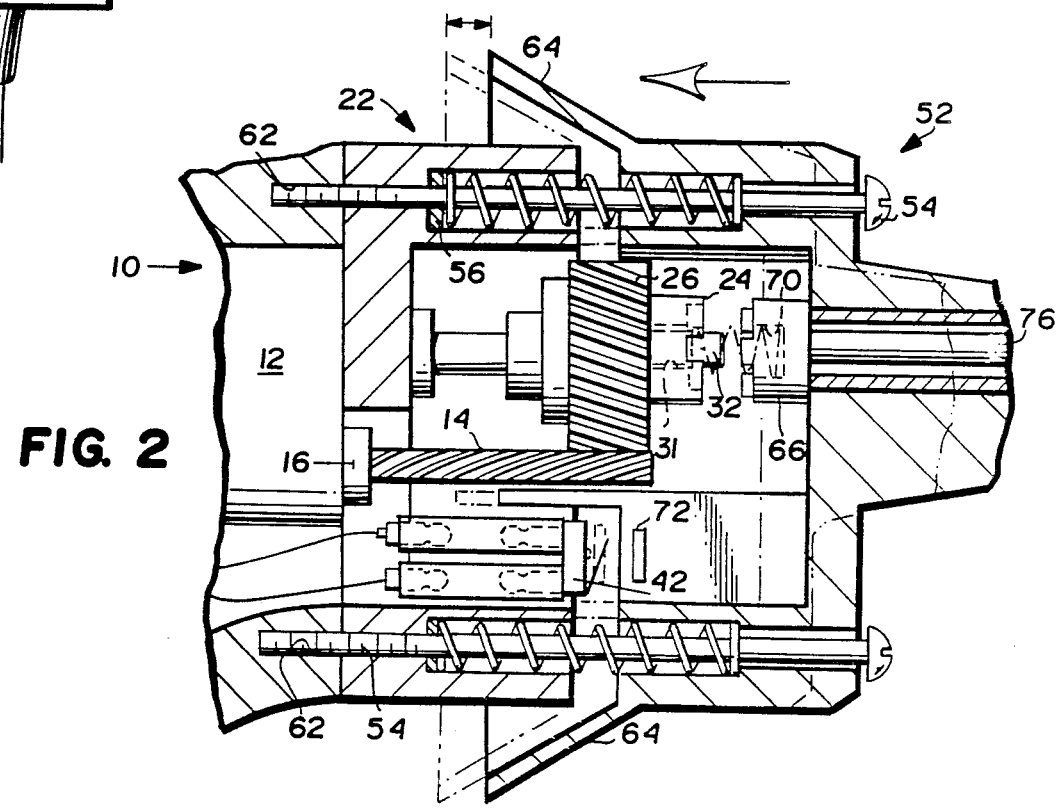
FIG. 2 is an enlarged fragmentary cross-sectional view illustrating the nosepiece and connection module in spaced-apart non-driving positions.
Figure 3:
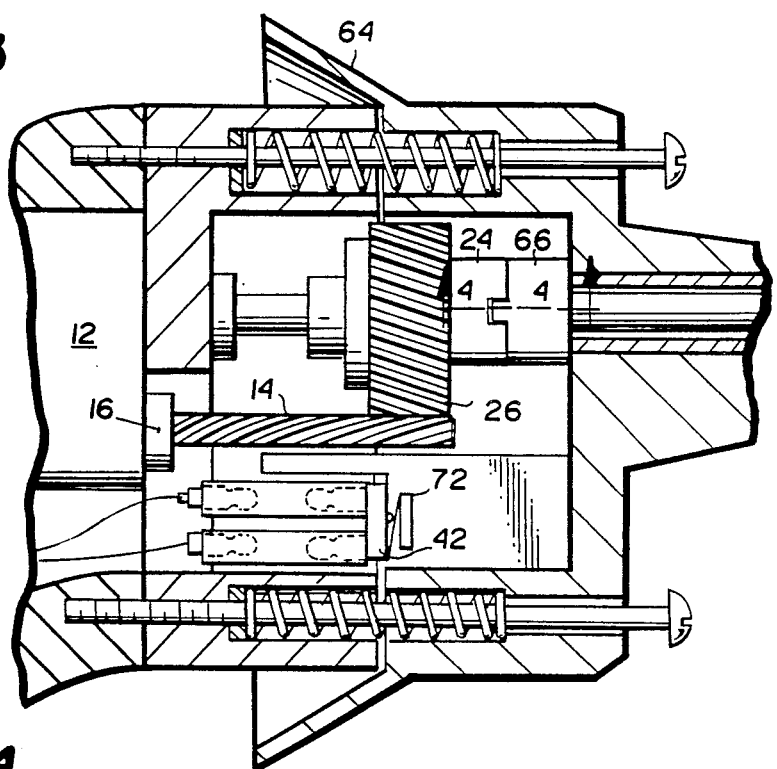
FIG. 3 is a view similar to FIG. 2 illustrating the nosepiece 52 bearing against the connection module, with the clutch in driving connection to drive the tool.

Referring to FIG. 2, the screws 54 are inserted through nosepiece screw passageways 53 in the nosepiece 52 and through connection module screw passageways 60 in the connection module 22 and screwed into screw seats 62 in the handle 10. The lock washers 56 on the screws 54 abut against shoulders 63 in the connection module screw passageways 60 to firmly mount the connection module 22 on the handle 10. Springs 58 are mounted on the screws 54 abutting the lock washers 56 and shoulders 57 in nosepiece screw passageways 53 so as to allow displacement of the nosepiece 52 with respect to the connection module 22 and to bias the nosepiece 52 away from the connection module 22.

Figure 5B:
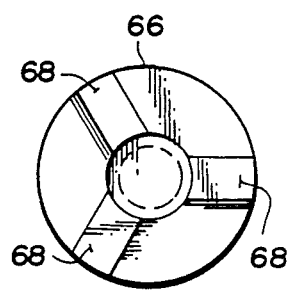
FIG. 5b is an enlarged end elevational view of the clutch plate looking from left to right in FIG. 1.
Figure 6:
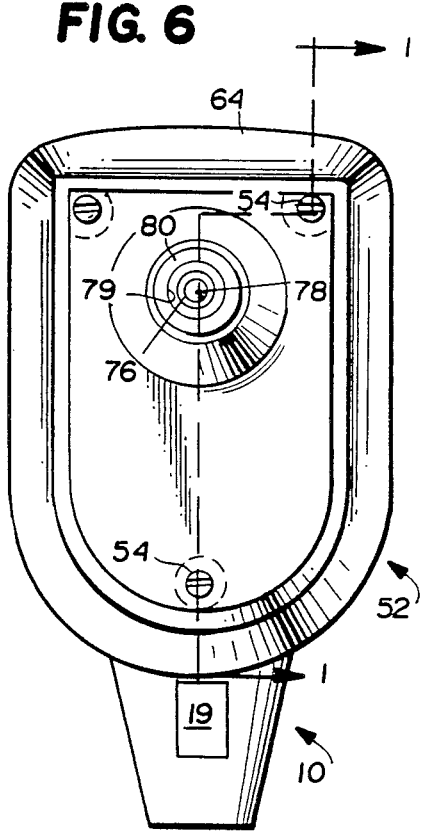
FIG. 6 is an end elevational view of the motorized tool hereof looking from right to left in FIG. 1.

The nosepiece 52 has flanges 64 to prevent the penetration of dust and dirt between the nosepiece 52 and the connection module 22. As best illustrated in FIG. 5b, a clutch plate 66 having three radial ridges 68 corresponding to the radial depressions 30 on the clutch bearing 24 is mounted for rotation in the nosepiece 52. The clutch plate 66 also has a shaft aperture 70 for receiving the shaft 32 on which the clutch bearing 24 is mounted. Thus, when the nosepiece 52 is mounted on the connection module 22, the clutch plate 66 also becomes mounted on the shaft 32 on which the clutch bearing 24 is mounted. A clutch spring 33 is mounted on the shaft 32 between the clutch bearing 24 and the clutch plate 66, biasing the clutch bearing 24 and clutch plate 66 away from each other.

An abutting plate 72 is integrally molded into the nosepiece 52 to abut against the lever arm 48 of the switch 42, so as to activate and deactivate the switch 42 as the nosepiece 52 is displaced. A grease shield 74 is integrally formed into the nosepiece 52 to prevent grease from the clutch bearing 24 and the clutch plate 66 from penetrating into the switch 42. The clutch plate 66 is attached to the clutch shank 76, which is hollow to allow insertion of a workpiece of tool 78, such as, for example, a drill bit. The clutch shank 76 projects out of the nosepiece 52 through clutch shank aperture 79 and a retaining ring 80 is attached to the end of the clutch shank 76 and abutting the nosepiece 52 so that pressure on the clutch shank 76 causes displacement of the nosepiece 52.

Figure 4:
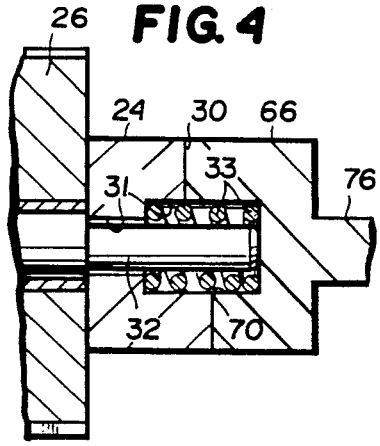
FIG. 4 is an enlarged fragmentary cross-sectional view illustrating the connection between the clutch bearing and clutch plate.

In operation, pressure on the tool 78 in a direction toward the work causes the retaining ring 80 to put pressure on the nosepiece 52, which causes the nosepiece 52 to be displaced towards the connection module 22 against the bias of the connection springs 58, and causes the clutch plate 66 to be displaced towards the clutch bearing 24 against the bias of the clutch spring 33. Upon displacement of nosepiece 52 toward connection module 22 abutting plate 72 pushes the lever arm 48 against the button 50 and causes the switch 42 to be activated. Thus, the motor 12 is started and causes the clutch bearing 24 to rotate. As more pressure is put on the tool 78 and nosepiece 52 moves into the position illustrated in FIG. 3, the clutch bearing 24 and the clutch plate 66 are brought into contact as illustrated in FIG. 4, causing rotation of the clutch shank 76 and therefore the tool 78. When pressure on the tool 78 is released, springs 58 bias the nosepiece 52 in a direction away from the connection module 22 with the screw heads on screws 54 limiting the forward movement of the nosepiece 52 as illustrated in FIG. 2. Simultaneously, the spring 33 displaces the clutch plate 66 with the nosepiece 52 from contact with the clutch bearing 24 whereby the drive is disconnected from the motor 12. Also, as nosepiece 52 is displaced forwardly, the abutting plate 72 disengages lever arm 48 of switch 42 such that electrical power to the motor 12 is disconnected.

If the switch 42 malfunctions, the user need only unscrew the three screws 54 and remove the nosepiece 52 in order to expose the switch 42 for maintenance. The switch 42 can be immediately detached and a replacement switch inserted in a matter of seconds. If the motor 12 malfunctions, the handle 10 can be detached from the connection module 22 and the electric motor first wire 20 and the forward-reverse switch first wire 21 can be easily disconnected from the connection module 22 by unplugging male plugs 18 and 23 from female sockets 34 and 36. A new handle 10 containing a new motor 12 can then be connected quickly.

While the present invention has been disclosed with respect to the preferred embodiment, it should be understood that there may be other embodiments which fall within the scope and spirit of the invention, as defined by the following claims. For example, and without limitation to the foregoing, the switch and the clutch bearing could be mounted on the handle, rather than in a separate connection module, and a nosepiece that covered the switch could be mounted directly on the handle.

What is claimed is:
1. A motorized tool, comprising:
a motor housing;
a motor mounted in said motor housing;
a switch detachably mounted on said motor housing;
a nosepiece having a tool assembly aperture removably mounted on said motor housing and over said switch whereby removal of said nosepiece exposes said switch for maintenance;
a tool assembly movably mounted in said nosepiece and projecting through said tool assembly aperture; and
means interconnecting said motor and said tool assembly for activating said tool assembly when said motor is energized.

2. A motorized tool, comprising:
a motor housing;
a motor mounted in said motor housing;
a switch responsive to displacement detachably mounted on said motor housing;
a nosepiece having a tool assembly aperture removably and displaceably mounted on said motor housing whereby displacement of said nosepiece closes said switch and energizes said motor;
a tool assembly movably mounted in said nosepiece and projecting through said tool assembly aperture; and
means interconnecting said motor and said tool assembly for activating said tool assembly when said motor is energized.

3. A motorized tool, comprising:
a motor housing having a switch aperture and a motor aperture;
a motor mounted in said motor aperture;
a switch detachably mounted in said switch aperture;
a movable cover for said switch aperture;
a nosepiece having a tool assembly aperture removably mounted on said motor housing;
a tool assembly movably mounted in said nosepiece and projecting through said tool assembly aperture; and
means interconnecting said motor and said tool assembly for activating said tool assembly when said motor is energized.

4. A motorized tool, comprising:
a motor housing;
a motor mounted in said motor housing;
a connection module detachably mounted on said motor housing;
a switch responsive to displacement detachably mounted on said connection module;
a nosepiece detachably and displaceably mounted on said connection module whereby displacement of said nosepiece closes said switch and energizes said motor;
a tool assembly rotatably mounted in said nosepiece whereby pressure on said tool assembly causes displacement of said nosepiece; and
means interconnecting said motor and said tool assembly for activating said tool assembly when said motor is energized.

5. A motorized tool, as described in claim 4, wherein said interconnecting means comprises:
a gear mounted on said motor;
a clutch bearing having peripheral teeth intermeshing with said gear rotatably mounted in said connection module;
a clutch plate mounted on said tool assembly; and a spring between said clutch bearing and said clutch plate biasing said clutch bearing and said clutch plate away from each other, whereby said clutch bearing and said clutch plate engage when said tool assembly is displaced and said motor is energized.

6. A motorized tool, as described in claim 5, wherein said motor is detachably connected to said switch.

7. An electric hand tool, comprising:
a handle;
an electric motor mounted in said handle;
a connection module detachably mounted on said handle;
a switch responsive to displacement removably mounted on said connection module;
a nosepiece having a tool assembly aperture detachably and displaceably mounted on said connection module whereby displacement of said nosepiece closes said switch and energizes said motor;
a tool assembly rotatably mounted in said nosepiece and projecting through said tool assembly aperture whereby pressure on said tool assembly causes displacement of said nosepiece; and
means interconnecting said motor and said tool assembly for rotating said tool assembly when said motor is energized.

8. An electric hand tool, as described in claim 7, wherein said interconnecting means comprises:
a gear mounted on said motor;
a clutch bearing having peripheral teeth intermeshing with the teeth of said gear rotatably mounted in said connection module;
a clutch plate mounted on said tool assembly; and
a spring between said clutch bearing and said clutch plate biasing said clutch bearing and said clutch plate away from each other, whereby said clutch bearing and said clutch plate engage when said tool assembly is displaced and said motor is energized.

9. An electric hand tool, as described in claim 8, wherein said clutch bearing comprises a circular disk having a plurality of peripheral teeth and three equally displaced radial depressions, and said clutch plate comprises a circular disk of substantially the same diameter as said clutch bearing having three equally displaced radial ridges corresponding to the radial depressions in said clutch bearing, whereby rotation of said clutch bearing causes rotation of said clutch plate when said clutch bearing and said clutch plate are engaged.

10. An electric hand tool, as described in claim 9, wherein said tool assembly comprises a shaft mounted on the axis of rotation of said clutch plate and projecting through said tool assembly aperture, a retaining ring mounted on said shaft abutting against the outside of said nosepiece, and a tool holder mounted on the end of said shaft that projects outside of said nosepiece.

11. An electric hand tool, as described in claim 10, wherein said switch is detachably electrically connected to said connection module by first female sockets mounted on said connection module and first male plugs projecting from said switch.

12. An electric hand tool as described in claim 11, wherein said connection module is detachably electrically connected to said motor and to the power source for said motor.

13. An electric hand tool, as described in claim 12, wherein said connection module is detachably electrically connected to said electric motor and the power source for said motor by second female sockets mounted on said connection module and second male plugs attached to the wires leading to said motor and said power source.

14. A motorized tool, as described in claim 3, wherein said interconnecting means comprises a clutch.

15. A motorized tool, as described in claim 14, wherein said clutch comprises:
a gear mounted on said motor;
a clutch bearing haing peripheral teeth intermeshing with said gear rotatably mounted in said motor housing;
a clutch plate mounted on said tool assembly; and
a spring between said clutch bearing and said clutch plate biasing said clutch bearing and said clutch plate away from each other, whereby said clutch bearing and said clutch plate engage when said tool assembly is displaced.

16. A motorized tool, as described in claim 15, wherein said clutch bearing comprises a circular disk having a plurality of peripheral teeth and three equally displaced radial depressions, and said clutch plate comprises a circular disk of substantially the same diameter as said clutch bearing having three equally displaced radial ridges corresponding to the radial depressions in said clutch bearing, whereby rotation of said clutch bearing causes rotation of said clutch plate when said clutch bearing and said clutch plate are engaged.

17. A motorized tool, as described in claim 14, wherein said motor is detachably connected to said switch.

18. A motorized tool, as described in claim 3, wherein said switch has an activating member, wherein said movable cover for said switch aperture has a hole formed therein, and wherein said activating member projects through said hole when said movable cover is mounted over said switch aperture.

19. A motorized tool, as described in claim 18, wherein said activating member comprises a lever arm.

20. A motorized tool, as described in claim 18, wherein said activating member comprises a button.

* * * * *